US006999727B2

(12) United States Patent  
Cazzaniga et al.

(10) Patent No.: US 6,999,727 B2  
(45) Date of Patent: Feb. 14, 2006

(54) METHOD TO IMPLEMENT A PERFORMANCE MONITORING FUNCTION ON THE GROUND OF THE RETRIEVED DATA THROUGH FEC (FORWARD ERROR CORRECTION) IN A TELECOM NETWORK

(75) Inventors: Giorgio Cazzaniga, Monte Marenzo (IT); Christian Addeo, Pordenone (IT); Francesco Schiavoni, Palaiseau (FR)

(73) Assignee: Alcatel, Paris (FR)

( * ) Notice: Subject to any disclaimer, the term of this patent is extended or adjusted under 35 U.S.C. 154(b) by 512 days.

(21) Appl. No.: 10/219,343

(22) Filed: Aug. 16, 2002

(65) Prior Publication Data

US 2003/0054770 A1    Mar. 20, 2003

(30) Foreign Application Priority Data

Sep. 17, 2001    (IT)    .......................... MI2001A1937

(51) Int. Cl.
*H04B 17/00* (2006.01)
*H04B 10/08* (2006.01)
*G01R 21/38* (2006.01)
*H04M 1/24* (2006.01)

(52) U.S. Cl. ................ 455/67.13; 455/423; 455/67.11; 379/1.01; 379/1.03; 398/9; 398/25; 398/27; 714/47; 714/704; 714/712; 714/752

(58) Field of Classification Search ............ 455/422.1, 455/423, 67.11, 67.13, 424, 425; 714/774, 714/708, 100, 746, 47, 48, 704, 712, 752, 714/799, 819; 398/175, 17, 25, 27, 9; 370/244, 370/241, 242, 252; 379/1.01, 1.03; 375/224, 375/227

See application file for complete search history.

(56) References Cited

U.S. PATENT DOCUMENTS

| 6,683,855 | B1 * | 1/2004 | Bordogna et al. .......... 370/244 |
| 6,772,388 | B2 * | 8/2004 | Cooper et al. .............. 714/774 |
| 2004/0091273 | A1 * | 5/2004 | Brissette et al. ............ 398/175 |

OTHER PUBLICATIONS

International Telecommunication Union, ITU-T G.707, Series G: Transmission Systems and Media, Digital Transmission Systems—Terminal Equipments—General, "Network Node Interface for Synchronous Digital Hierarchy (SDH)", Mar. 1996, pp. 1-128.
International Telecommunication Union, ITU-Telecommunication Standardization Sector, Study Group 15, Geneva, Apr. 3-14, 2001, Editor, G.709, pp. 1-46.
International Telecommunication Union, ITU-T G.975, Series G: Transmission Systems and Media, Digital Systems and Networks, Digital Transmission Systems—Digital Sections and Digital Line System—Optical Fibre Submarine Cable Systems, "Forward Error Correction for Submarine Systems", Nov. 1996, pp. 1-11.
International Telecommunication Union, ITU-T G.optperf, Series G: Transmission Systems and Media, Digital Systems and Networks, Digital Transmission Systems—Quality and availability, "Error and Availability Performance Parameters and Objectives for International Paths within the Optical Transport Network (OTN)", May 2001, pp. 1-25.

* cited by examiner

*Primary Examiner*—Nick Corsaro
*Assistant Examiner*—Raymond B. Persino
(74) *Attorney, Agent, or Firm*—Sughrue Mion, PLLC

(57) ABSTRACT

Herein, it is described a method for implementing a Performance Monitoring function according to data retrieved through FEC (Forward Error Correction), in a telecommunication network, which is based on the correlation of information relating to "corrected" and "uncorrected" blocks deriving from the implementation of the FEC function.

7 Claims, 1 Drawing Sheet

METHOD TO IMPLEMENT A PERFORMANCE MONITORING FUNCTION ON THE GROUND OF THE RETRIEVED DATA THROUGH FEC (FORWARD ERROR CORRECTION) IN A TELECOM NETWORK

INCORPORATION BY REFERENCE OF PRIORITY DOCUMENT

This application is based on, and claims the benefit of, Italian Patent Application No. MI2001A001937 filed on Sep. 17, 2001, which is incorporated by reference herein.

BACKGROUND OF THE INVENTION

1. Field of the Invention

The present invention relates to a method for implementing a Performance Monitoring function according to data retrieved through FEC (Forward Error Correction), in a telecommunication network.

2. Description of the Prior Art

The Forward Error Correction (FEC) mechanism is known in the transmission field as a methodology for correcting transmission errors, for example in the synchronous systems, such as SDH (Synchronous Digital Hierarchy) or SONET (Synchronous Optical NETwork), or in the optical systems, such as OTN (Optical Transmission Network), which is based on the insertion of redundancy bits at transmission and on the consequent errors correction at the receiving side.

Substantially, there are two types of FEC:
- in-band FEC: the redundancy bits are transported within the frame (in SDH, for instance, they are in the header SOH, Section OverHead) so that the frame bit-rate is not increased;
- out-of-band FEC: the redundancy bits are transported in an auxiliary frame which is added to the frame itself, thus slightly increasing the frame bit-rate.

The properties of the FEC system are well known to the man skilled in the art, being also subject of the Standards ITU-T G.707, G.709 and G.975.

It is also known the need of defining a procedure for determining PM (Performance Monitoring), which consists in the evaluation of the path (link) quality, based on the evaluation of the result of the FEC procedure.

The known procedures for the PM determination based on the data of FEC (see Standard ITU-T G.optperf, which is going to be defined) foresee the independent use of two uncorrelated sets of primitive counters for corrected errors in respective information blocks and uncorrected blocks, which are hereunder defined.

The arising problem is that this approach does not deliver sufficient information about the real transmission quality of the path (link). In fact, under conditions of bad transmission quality, the error counter does not provide reliable data as it refers to information blocks which can not be corrected through the FEC procedure; furthermore, also the evaluation of BER (Bit Error Rate) is not possible.

SUMMARY OF THE INVENTION

Therefore, the object of the present invention is to overcome the above said problems and to indicate a method for implementing a Performance Monitoring PM function according to data that are retrieved through FEC, in a telecom network, which is based upon the correlation of information relating to "corrected" and "uncorrected" information blocks deriving from the implementation of the FEC function.

Therefore, the basic idea is that it is possible to have a better indication on the status of path (link) through the implementation of the PM function based upon the correlation of the information regarding "corrected" and "uncorrected" information blocks deriving from the implementation of the FEC function.

In order to achieve these objects, the present invention provides a method of implementing a Performance Monitoring function according to data retrieved through FEC in a telecommunication network, as well as a management system comprising said function, as better described in the claims, which form an integral part with the present description.

The method for implementing a Performance Monitoring function which is the object of the present invention results in the fundamental advantage of being used for FEC applications, either in-band or out-of-band, defined for the OTN and SDH or SONET transmission levels.

Further objects and advantages of the present invention will become clear thanks to the hereinafter detailed description, supplied by way of an explicative but non-limiting example.

BEST MODE FOR CARRYING OUT THE INVENTION

Figure 1:
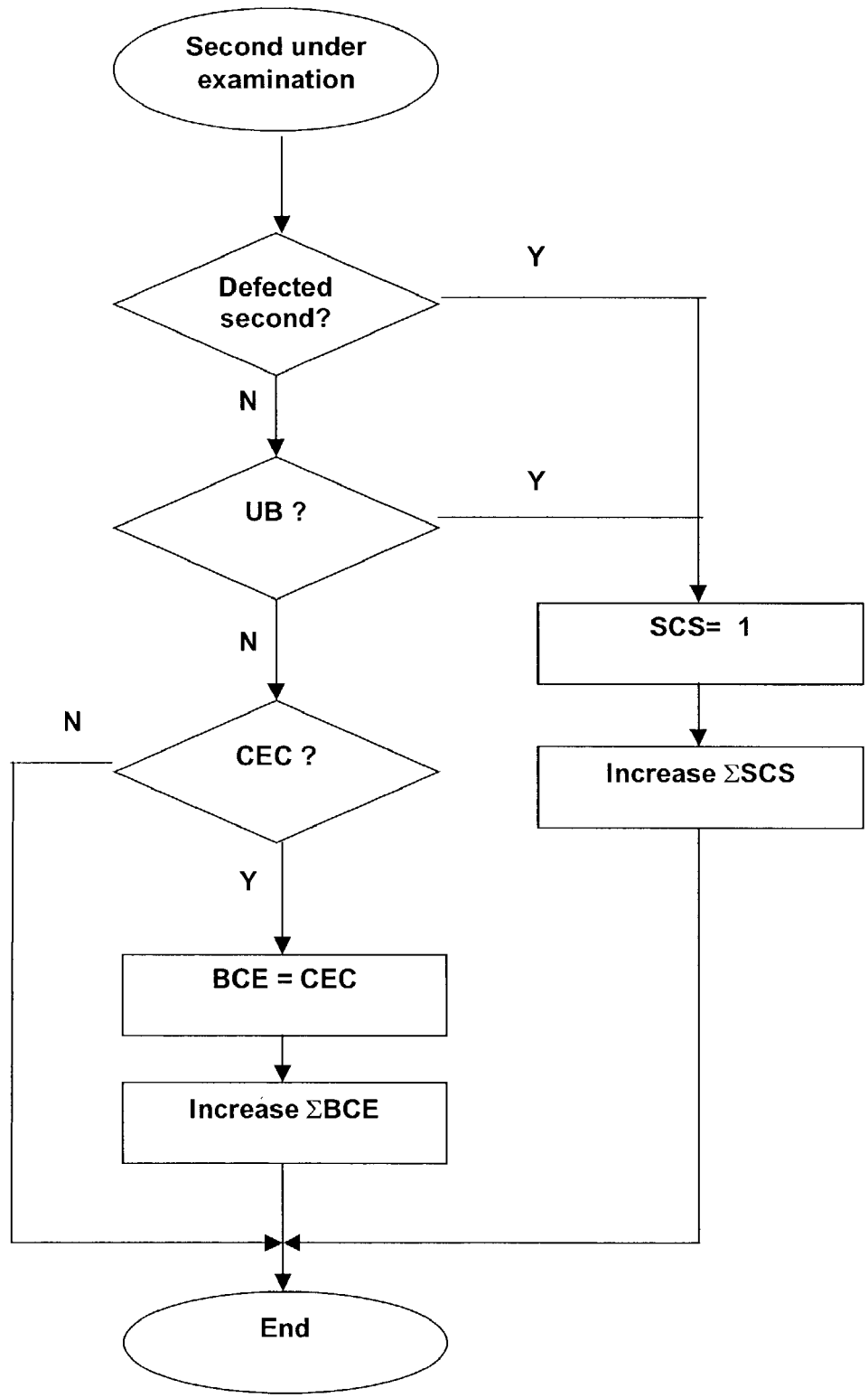
FIG. 1 illustrates a flow chart for the explanation of the calculation procedure of PM data which are the subject of the present invention.

Hereunder, it is described in the detail the procedure to implement the Performance Monitoring PM function which is the subject of the present invention.

The following definitions are given:
- uncorrected block: a code word (e.g. 255 bytes long corresponding to 1 ReedSolomon (255,239) of coding/decoding) which has not been corrected by FEC;
- corrected block: or a code word or a symbol byte which has been corrected by applying FEC.

The following primitives can be obtained from a FEC end function, performed in the network node:
- CEC, corrected errors: number of errors (CE) that are corrected by the FEC mechanism in the time interval considered; this value can be also seen as indication of the path degradation;
- UBC, uncorrected blocks: number of blocks (UB) that are not corrected in the time interval considered; when the FEC algorithm is not able to correct the errors introduced (for instance because the number of errors exceeds the correction capacity), the corresponding block is defined as "uncorrected", as it is not correctable;
- DS: defect second: period of 1 second, wherein at least one of the known LOS (Loss of Signal) or LOFEC (Loss of FEC: loss of FEC frame alignment) defects has occurred. The time period of 1 second is to be considered in a non-limiting way as base reference for the application of the method according to the present invention.

According to the present invention, it has been proved that both the CEC and UBC primitives can not be considered as independent. The presence of at least one uncorrected block is an indication of high degradation. In this condition, the CEC becomes meaningless.

Based on these considerations, the following events have been defined for the determination of the performance monitoring PM based on the FEC:

BCE: background corrected errors: it is the number of CE errors that are corrected in a "non SCS" second, namely a second at low frequency of errors, wherein the errors can be corrected;

SCS: severely corrected second: it is either a defect second DS or a second wherein at least one uncorrected block UB has been detected (or both the conditions).

A first data item of PM is made-up of (average) line BER, $BER_{IN}$, which can be evaluated in the following simple way, by applying the procedure on determined time intervals, formed by a NSEC number of base reference time periods (of 1 second):

$$BER_{IN} = \Sigma BCE/(NSEC - \Sigma SCS)$$

wherein $\Sigma$ is the summation of values of BCE and SCS events in the whole determined time interval.

Therefore, from the $BER_{IN}$ formula, it is possible to see the correlation existing between the information regarding the corrected blocks ($\Sigma$ BCE) and the uncorrected blocks ($\Sigma$SCS).

For example, by selecting in a non-limiting way, total time intervals of 15 minutes (containing 900 sec):

$$BER_{IN} = \sum_{1} BCE \bigg/ \bigg(900 - \sum_{1} SCS\bigg)$$

Or by selecting total time intervals of 24 hours (86400 sec):

$$BER_{IN} = \sum_{2} BCE \bigg/ \bigg(86400 - \sum_{2} SCS\bigg)$$

wherein $$\sum_{1} \text{ and } \sum_{2}$$

are the summations of the values of the BCE and SCS events in the time intervals, respectively, of 15 minutes and 24 hours.

A second data item of PM, relating to the non-availability of the connection (understood as a global service) is given by the sum of SCS seconds for a given time interval.

With reference to FIG. 1, the calculation of the BCE and SCS values is based on the application of the following sequence of functions, which are carried out in an iterative way on base reference time intervals (1 second):

If in the second (DS second) under examination there is a defect, the second results in an indication of SCS=1, and a second counter SCS $$\bigg(\sum_{1} SCS \text{ or } \sum_{2} SCS\bigg)$$

is increased by one on the total time interval (15 minutes or 24 hours), and then it is ended; the same occurs if, in the second under examination, there is at least one UB block; otherwise, the number of corrected errors CEC is checked: in case of no corrected error, the procedure ends, otherwise the value of BCE is set equal to CEC in the second considered; then, an error counter BCE $$\bigg(\sum_{1} BCE \text{ or } \sum_{2} BCE\bigg)$$

of the total time interval is increased by that CEC value and then it is ended.

The sequence of functions described is carried out for a number of times equal to the number of seconds in the total time interval: 900 times for 15 minutes or 86400 times for 24 hours in the non-limiting example above described.

At the end of the total time interval, the following values:

$$\sum_{1} SCS, \sum_{1} BCE \text{ or } \sum_{2} SCS, \sum_{2} BCE,$$

and $BER_{IN}$, which are stored as representative values of the PM for that time interval, are obtained. Then, the above said procedure starts again, at the beginning of the next total time interval, by setting the counters to zero.

In the implementation, the above described calculations are carried out in the network elements of the telecom network, by inserting them as hardware or software procedures that are additional to the PM ones which are already generally provided and known to the man skilled in the art, by applying the same designing methods.

The results of counters $$\sum_{1} SCS, \sum_{1} BCE \text{ or } \sum_{2} SCS, \sum_{2} BCE,$$

and of $BER_{IN}$ are also made available to the network management system through the normal known communication procedures to the field technician.

Therefore, from the above description, it is evident how to obtain a telecommunication network management system, and the corresponding network, properly modified in order to include the operations provided by the method to implement a Performance Monitoring function according to FEC-obtained data according to the present invention.

From the basic know-how and the above mentioned description, the man skilled in the art can implement the present invention.

The present invention can advantageously be implemented by a computer software comprising program code means adapted to perform one or more method steps, when said program is run on a computer. Therefore, it is understood that the scope of protection should be considered as extended to such a computer software as well as to a computer readable medium having a program recorded thereon, said computer readable medium comprising computer program code means adapted to perform one or more steps of the method, when said program is run on a computer.

Many changes, modifications, variations of the present invention will become clear to those who are expert in this field after having considered the present description and the enclosed drawings which illustrate its preferred embodiments. All these changes, modifications, variations which are not far away from the spirit and the scope of the invention are considered belonging to the invention.

We claim:

1. A method for implementing a Performance Monitoring function in a telecommunication network, the method comprising the steps of:

receiving blocks of data;
   obtaining data through a Forward Error Correction function carried out on the blocks of received data;
   classifying said blocks either as corrected or uncorrected through said Forward Error Correction function; and
   calculating said Performance Monitoring function by implementing a correlation of the information regarding said corrected and uncorrected blocks;
   wherein said correlation of the information regarding said corrected and uncorrected blocks includes calculating information comprising:
      a defected base reference time period (SCS) or a time period where at least an uncorrected block (UB) has been detected; and
      a number of corrected errors (BCE) in a non-SCS base reference time period.

2. A method according to claim 1, wherein said Performance Monitoring function is calculated according to the following relation, applied in an iterative way on determined total time intervals (NSEC), consisting in a number of base reference time periods:

$$BER_{IN} = \Sigma BCE / (NSEC - \Sigma BCE - SCS)$$

wherein: $\Sigma$ is the summation of the values of the BCE and SCS events in the determined total time interval; $BER_{IN}$ is the Bit Error Rate which constitutes a measure of said Performance Monitoring (PM) function in the total time interval.

3. A method according to claim 2, wherein said information regarding said "corrected" and "uncorrected" blocks are calculated through the application of the following sequence of operations, which are carried out in an iterative way on said base reference time intervals:

if in the present base reference time interval there is a defect (DS), a counter of base reference time period SCS ($\Sigma$ SCS) is increased by one on the total time interval (NSEC), and it is ended; the same is valid, if in the second under examination there is at least an uncorrected block (UB);
   otherwise there is the number of corrected errors (BCE) in the present base reference time interval and the error counter ($\Sigma BCE$) in the time interval is incremented by that value (BCE) and it is ended;
   the sequence of functions being carried out a number of times equal to the number of the base reference time interval in the total time interval.

4. A management system of a telecommunication network, comprising:

means for implementing a Performance Monitoring function based on data retrieved through a Forward Error Correction function;
   means for receiving blocks of data;
   means for obtaining data through the Forward Error Correction function carried out on the blocks of received data;
   means for classifying said blocks either as corrected or uncorrected through the Forward Error Correction function; and
   means for calculating the Performance Monitoring function by implementing a correlation of the information regarding said corrected and uncorrected blocks;
   wherein said correlation of the information regarding said corrected and uncorrected blocks includes calculating information comprising:
      a defected base reference time period (SCS) or a time period where at least an uncorrected block (UB) has been detected; and
      a number of corrected errors (BCE) in a non-SCS base reference time period.

5. A telecommunication network having a management system, said telecommunication network comprising:

means for implementing a Performance Monitoring function based on data retrieved through a Forward Error Correction function;
   means for receiving blocks of data;
   means for obtaining data through the Forward Error Correction function carried out on the blocks of received data;
   means for classifying said blocks either as corrected or uncorrected through the Forward Error Correction function; and
   means for calculating the Performance Monitoring function by implementing a correlation of the information regarding said corrected and uncorrected blocks;
   wherein said correlation of the information regarding said corrected and uncorrected blocks includes calculating information comprising:
      a defected base reference time period (SCS) or a time period where at least an uncorrected block (UB) has been detected; and
      a number of corrected errors (BCE) in a non-SCS base reference time period.

6. A computer program having a program code adapted to perform one or more steps when said program is run on a computer, said computer program comprises:

implementing a Performance Monitoring function based on data retrieved through a Forward Error Correction function;
   receiving blocks of data;
   obtaining data through the Forward Error Correction function carried out on the blocks of received data;
   classifying said blocks either as corrected or uncorrected through the Forward Error Correction function; and
   calculating the Performance Monitoring function by implementing a correlation of the information regarding said corrected and uncorrected blocks;
   wherein said correlation of the information regarding said corrected and uncorrected blocks includes calculating information comprising:
      a defected base reference time period (SCS) or a time period where at least an uncorrected block (UB) has been detected; and a number of corrected errors (BCE) in a non-SCS base reference time period.

7. A computer readable medium having recorded thereon a computer program code, adapted to enable a computer to perform steps comprising:

implementing a Performance Monitoring function based on data retrieved through a Forward Error Correction function;

receiving blocks of data;

obtaining data through the Forward Error Correction function carried out on the blocks of received data;

classifying said blocks either as corrected or uncorrected through the Forward Error Correction function; and calculating the Performance Monitoring function by implementing a correlation of the information regarding said corrected and uncorrected blocks;

wherein said correlation of the information regarding said corrected and uncorrected blocks includes calculating information comprising:

a defected base reference time period (SCS) or a time period where at least an uncorrected block (UB) has been detected; and a number of corrected errors (BCE) in a non-SCS base reference time period.

* * * * *